Figure 1:
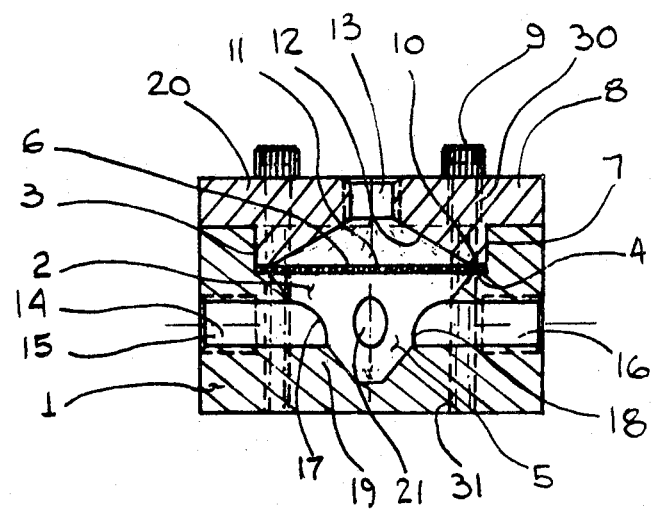

United States Patent [19] … [11] 3,749,353
Pauliukonis … [45] July 31, 1973

[54] MEMBRANE SHUTOFF VALVE
[76] Inventor: Richard S. Pauliukonis, 6660 Greenbriar Dr., Cleveland, Ohio 44130
[22] Filed: June 24, 1971
[21] Appl. No.: 156,431

[52] U.S. Cl. ................................. 251/61.1, 251/25
[51] Int. Cl. ................................................ F16k 7/12
[58] Field of Search .............................. 251/61.1, 30

[56] References Cited
UNITED STATES PATENTS

| | | | |
|---|---|---|---|
| 3,159,374 | 12/1964 | Kroffke | 251/61.1 X |
| 3,083,943 | 4/1963 | Stewart, Jr. et al. | 251/61.1 |
| 3,282,552 | 11/1966 | Sommese, Sr. | 251/30 X |
| 2,572,175 | 10/1951 | McPherson | 251/61.1 X |
| 3,078,066 | 2/1963 | Moore | 251/61.1 |
| 2,698,711 | 1/1955 | Newcomb | 251/61.1 X |

FOREIGN PATENTS OR APPLICATIONS

| | | | |
|---|---|---|---|
| 1,158,618 | 1/1958 | France | 251/61.1 |

Primary Examiner—Arnold Rosenthal

[57] ABSTRACT

A membrane operated, pilot actuated, normally open two way shutoff valve having a pilot cap permanently secured to the valve housing, and a membrane separating piloting section from the valving section and held securely by a pilot cap at it's periphery while the central portion is allowed to stretch under pilot pressure and to close fluid valving passages inside valve housing when controlling flows of any fluid requiring straight through flow passages with minimum pressure drop, including positive support for stretched membrane inside valve housing which is provided with appropriate seat of conical configuration to permit membrane elastic deformation within confines of such housing cone and not more, and thus drastically changing the operation and life span of similar valves with unsupported elastomers as found in most diaphragm valves, with membrane providing simplicity and operational improvements, and the Memrane Shutoff Valve permitting flexibility in use no other designs can provide, such as multiporting valve housing for single fluid inlet port and multiple outlet ports running radially into the conical housing chamber or even being converted to a positive displacement pump by an addition of appropriate check valves into the valve ports, and flexibility in selecting seal and valve body materials compatible with corrosive fluids valved while the pilot cap may remain the same.

3 Claims, 2 Drawing Figures

BY

RICHARD S. PAULIUKONIS

MEMBRANE SHUTOFF VALVE

The present invention provides extrememly simple means of controlling process flow under pressure irrespective of the flow medium. It also approaches ideal shutoff valve condition with zero pressure drop when valve is open. Mass of moving parts, pressure differentials, frictional forces, travel of valving elements and actuation forces, maintenance and cost of the valves presently in existence instigated the search for a better valve for simple shut-off function, all of which have been mastered by this invention.

Devices of this type which require fewer components for valve construction and operation, and improve ultimate performance of the system are obviously desirable because they provide a simple, inexpensive and reliable means of shutting-off fluid flow in a shutoff valve at less cost initially and in service.

These and other objects and advantages of the invention will become more fully apparent from the following description of the embodiment of the invention, taken together with the accompanying drawings.

In the drawings:

FIG. 1 illustrates a cross-sectional view of the membrane valve with fluid flow passages open and the membrane in neutral position, condition typical to normally open valve.

Figure 2:
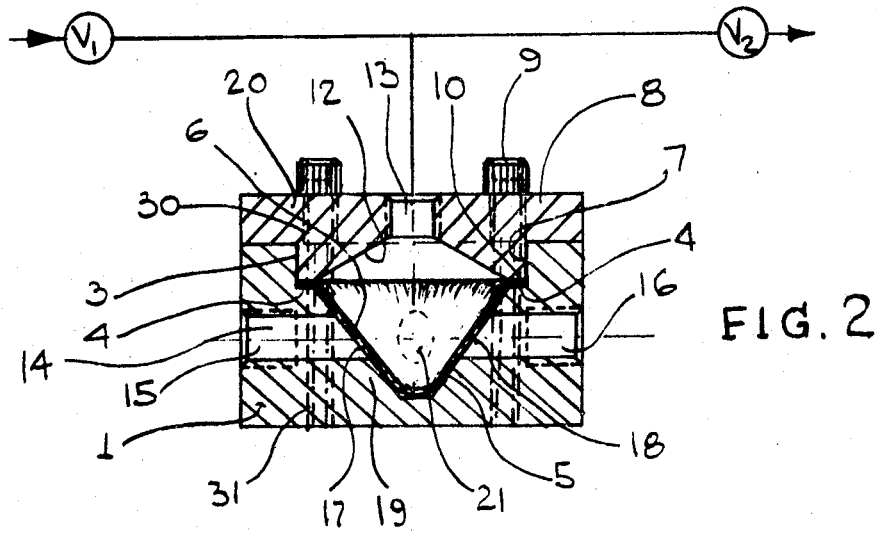

FIG. 2 identifies the valve closed with pilot pressure force over the membrane which is seated inside the conical valve body chamber.

Shown in FIG. 1 is a valve housing 1, one end of which is provided with a blind opening 2 having circular counterbore 3 with shoulder 4 and a conical end 5 serving as a seat for valve closure 6 of elastomer membrane type. This elastic closure membrane 6 of disc configuration to fit circular counterbore 3 is placed against shoulder 4 and secured permanently there by shoulder 7 of the pilot cap 8 with appropriate screws 9 which enter pilot cap through peripherally distributed clearance holes 30, and continue through threaded valve body holes 31 to enable securing the membrane inside the housing along its perimeter 10 while the central membrane section 11 is unsupported and is free to move elastically from its neutral position to any desired position. The pilot cap 8 having said shoulder 7 centrally located is also provided with a conical end 12 which terminates with a pilot port 13.

Perpendicular to the conical end 5 of the housing opening 2 there is a straight through bore 14 provided, to continue from the one housing end serving as fluid infeed port 15 to another housing end serving as fluid exhaust port 16, and to cut across the cone 5 at points 17 and 18 respectively, to enter cone 5 in continuation of fluid communication between the infeed and exhaust ports.

With membrane in the location illustrated in FIG. 1, the valve becomes devided into the working fluid portion 19 and the pilot actuating portion 20 both of which are separate independent entities distinctly dependent on the separation said membrane defines.

When the valve is installed into a circuit (not illustrated), with the infeed port 15 connected to a fluid reservoir, and the exhaust port 16 connected to a receiver of any process system, the working fluid portion 19 experiences an uninterrupted straight-through fluid flow between the infeed and exhaust ports via conical chamber 5 with practically no pressure drop. An additional port 21 shown in FIG. 1 inside conical chamber 5 can serve as multiexhaust for this valve. Additional ports (not shown) leading out of the conical body end 5 may be provided to increase valve utilization in that a single infeed port may serve multiexhaust requirements similar to those of a manifold by simply employing the valve body portion rather than using the complicated piping arrangement commonly found in other designs.

This normally open valve condition illustrated in FIG. 1 may be changed to a valve shut-off condition illustrated in FIG. 2.

In FIG. 2 identifying the valve closed condition, the pilot actuating portion 20 in the illustrated case has port 13 connected to a pilot supply system including a valve $V_1$ leading from a pilot supply, and a valve $V_2$ leading to a pilot exhaust. With valve $V_1$ open and valve $V_2$ closed, port 13 is subjected to full pilot fluid pressure. This pressure acting over membrane 6 side of the pilot actuation portion 20 forces the membrane to stretch and to assume the position limited by the valve body cone 5 serving as a seat for valve closing, thereby insuring a seal tight position of the valve and a complete shut-off of the fluid communication between the body fluid infeed port 15 and fluid exhaust port 16 including all other additional exhaust ports such as port 21 shown in addition to the straight through flow passage between the infeed and exhaust ports identified therein. This needs pilot pressure larger than the working fluid pressure inside housing portion 19 by a slight margin for good seal.

With the valve $V_1$ closed and the valve $V_2$ open, port 13 experiences a pressure drop down to that of atmospheric pressure condition, with subsequent return of membrane to the original unstretched position whereby the communication in the working fluid portion of the valve body becomes reestablished to that of valve normally open position. In case the working fluid inside portion 19 exceeds the elastic constants of the membrane upon its return to the unstretched position shown in FIG. 1, the membrane may be partially stretched in the opposite direction against the conical end 12 of the pilot cap provided therein, not shown, but assumed to be normal with working fluid pressure acting over the opposite side of membrane from the working fluid side 19 of the housing, and the pilot cone 12 acting as a stop.

As the central membrane unsupported section 11 can be forced into one or the other position to open or to seal the valve passages simply by manipulation of the pilot valves $V_1$ or $V_2$ which either supply pressure to the membrane for valve sealing or exhaust this pressure for restoration of fluid flow inside valve body, the function of the pilot supply and exhaust may be performed by a solenoid valve (not shown) that can be screwed into port 13 for automatic valve operation which is considered obvious for those skilled in this art, without additional description of case in question.

The valve housing 1 and the membrane 6 may be selected from the materials that are compatible with fluids valved while the pilot cap including pilot controls need not be changed because they do not contact working fluid inside housing portion 19 which is separated from the pilot actuation portion 20 at all times as described earlier.

Because of simplicity in membrane design which represents a simple disk cut out of a sheet of elastomer material chosen, the replacement of membrane does in fact become a matter of uncomplicated maintenance without cost for membrane normally associated with other designs.

In another application, not shown, this valve may be easily converted to a positive displacement pump when check valves are used in the fluid infeed and exhaust ports of the valve housing of the working fluid portion 19. Upon each application of the pilot pressure to the actuating portion 20, the pump will disperse fluid amount equivalent to the cavity of the conical end 5 of the blind opening 2 of housing 1. This is also obvious for those skilled in this art. The invention is not restricted to the slavish imitation of each and every one of the details described above which has been set forth merely by way of example with the intent of most clearly setting forth the teachings of the invention. Obviously, devices may be provided which change, eliminate or add certain specific structural or procedural details without departing from the invention.

I claim:

1. A shutoff valve for controlling the flow of pressurized fluids between an inlet and an outlet of the shutoff valve in response to a pilot pressure being applied to the shutoff valve comprising:
    a valve body having a conically shaped cavity;
    a constant cross-sectional area inlet port extending linearly through one side of said valve body into the cavity of said valve body;
    an outlet port having the constant cross-sectional area of said inlet port, said outlet port extending linearly through the opposite side of said valve body and being in-line with said inlet port to provide straight through flow of the pressurized fluid from said inlet port to said outlet port by way of said valve body cavity;
    a pilot cap having a conically shaped cavity with a pilot pressure port extending through said pilot cap into said opening of said pilot cap;
    a stretchable membrane mounted in a flat plane between said valve body and said pilot cap, said membrane allowing straight through flow of said pressurized fluid from said inlet port to said outlet port prior to said pilot pressure being applied to said pilot pressure port, said stretchable membrane responding to a predetermined pilot pressure being applied to said pilot cap cavity through said pilot port to expand said membrane from said flat plane position to conform to the conically shaped cavity of said valve body and prevent fluid flow between said inlet and said outlet ports.

2. A shutoff valve as set forth in claim 1 wherein the expansion of said stretchable membrane to conform to said valve body cavity is effected within the elastic expansion limits of said membrane.

3. A shutoff valve as set forth in claim 2 wherein said stretchable membrane responds to said pressurized fluid exceeding said predetermined pilot pressure to expand into conformity with the walls of said pilot cap cavity, said expansion being effected within the elastic limits of said membrane.

* * * * *